(12) United States Patent
Boucadair et al.

(10) Patent No.: US 8,761,155 B2
(45) Date of Patent: Jun. 24, 2014

(54) METHOD OF TAKING ACCOUNT OF QUALITY OF SERVICE BETWEEN DISTINCT IP TELEPHONY DOMAINS, AND A CORRESPONDING LOCATION SERVER AND COMPUTER PROGRAM

(75) Inventors: Mohamed Boucadair, Caen (FR); Pierrick Morand, Bretteville sur Odon (FR)

(73) Assignee: France Telecom, Paris (FR)

( * ) Notice: Subject to any disclaimer, the term of this patent is extended or adjusted under 35 U.S.C. 154(b) by 1144 days.

(21) Appl. No.: 12/297,975

(22) PCT Filed: Apr. 20, 2007

(86) PCT No.: PCT/FR2007/051151
§ 371 (c)(1),
(2), (4) Date: Oct. 21, 2008

(87) PCT Pub. No.: WO2007/122355
PCT Pub. Date: Nov. 1, 2007

(65) Prior Publication Data
US 2009/0175266 A1 Jul. 9, 2009

(30) Foreign Application Priority Data
Apr. 21, 2006 (FR) ..................................... 06 03623

(51) Int. Cl.
*H04L 12/66* (2006.01)
*H04L 12/28* (2006.01)

(52) U.S. Cl.
USPC ....................... 370/352; 370/395.21; 370/401

(58) Field of Classification Search
CPC ... H04L 45/04; H04L 45/302; H04L 45/3065; H04L 65/1069; H04L 65/80; H04L 67/322
USPC .................. 370/352–356, 401, 395.1–395.21
See application file for complete search history.

(56) References Cited

U.S. PATENT DOCUMENTS

| 6,584,093 | B1 | 6/2003 | Salama et al. | |
|---|---|---|---|---|
| 2001/0001000 | A1* | 5/2001 | Thomas et al. | 370/200 |
| 2002/0114282 | A1* | 8/2002 | MeLampy et al. | 370/238 |
| 2006/0090023 | A1* | 4/2006 | Olsen et al. | 710/107 |
| 2007/0201366 | A1* | 8/2007 | Liu | 370/235 |

FOREIGN PATENT DOCUMENTS

WO 02058349 A 7/2002

OTHER PUBLICATIONS

J. Rosenberg, Telephony Routing over IP (TRIP) [RFC 3219], Jan. 2002, Network Working Group.*
International Search Report of Counterpart Application No. PCT/FR2007/051151 filed on Apr. 20, 2007.
Rosenberg et al., "Telephony Routing Over IP (TRIP)", Jan. 2002.
International Preliminary Report on Patentability and English translation of the Written Opinion dated Dec. 3, 2008 for corresponding International Application No. PCT/FR2007/051151, filed Apr. 20, 2007.

* cited by examiner

*Primary Examiner* — Asad Nawaz
*Assistant Examiner* — Joel Hamel
(74) *Attorney, Agent, or Firm* — David D. Brush; Westman, Champlin & Koehler, P.A.

(57) ABSTRACT

A method for propagating at least one route for at least one digital stream between a first location server of a first IP telephony domain and a second location server of a second IP telephony domain. The first location server belongs to a first autonomous system and the second location server belongs to a second autonomous system. The method includes sending digital stream routing update messages to the second location server. The update messages contain information for managing quality of service, and, prior to being propagated towards the second server, the information is updated by the first server. The information includes at least one of the following: information about a quality of service component associated with at least one autonomous system, referred to as a system component; and information about a quality of service component associated with at least one IP telephony domain, referred to as a domain component.

13 Claims, 6 Drawing Sheets

METHOD OF TAKING ACCOUNT OF QUALITY OF SERVICE BETWEEN DISTINCT IP TELEPHONY DOMAINS, AND A CORRESPONDING LOCATION SERVER AND COMPUTER PROGRAM

CROSS-REFERENCE TO RELATED APPLICATIONS

This Application is a Section 371 National Stage Application of International Application No. PCT/FR2007/051151, filed Apr. 20, 2007 and published as WO 2007/122355 on Nov. 1, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telephony on Internet type networks using Internet protocol (IP). The term "telephony" is used to mean not only conventional telephony services, but also video phone services or synchronous digital transfer services.

More precisely, the present disclosure lies in the context of taking account of quality of service parameters enabling telephony domain management entities to route calls while offering optimum quality of service.

In particular, the disclosure relates to a method of managing quality of service between telephony domain management entities on networks that make use for example of a communication mechanism based on Internet Protocol (IP).

In particular, the disclosure relates to a method of managing quality of service between telephony domain management entities on networks that make use, for example, of a communication mechanism based on Internet protocol (IP).

In particular, the disclosure relates to a method of managing quality of service between management entities of telephony domains on networks that implement, by way of example, a communication mechanism based on the Internet protocol (IP).

The IP network is the backbone network adopted by operators for pooling the heterogeneous services they offer, including IP telephony, commonly referred to as voice over IP (VoIP), or more generally grouped under the heading of conversational services.

The deployment of these real time voice or video applications towards an all-IP network, and also the migration of the public switched telephone network (PSTN) thereto are constraining operators to provide global coverage for these services on a worldwide scale. This means that it is not sufficient to provide points of presence all over the globe, but that clients must be given the option of calling any destination (specifically clients of other operators). This global coverage can be achieved by establishing interconnection agreements with other third-party service providers in order to extend the scope of a service outside the administrative borders of a single service provider.

On these lines, it is expected that co-operation between providers of VoIP/ToIP (telephony over IP) services will intensify in the short and medium term. This intensification should enable traffic associated with voice to be delivered to termination points that lie outside the IP telephony administration domains (ITADs) of operators. Such co-operation between providers is of strategic important since conventional bilateral type agreements do not make it possible to obtain the global coverage that operators require.

In addition, offers of telephony deployed over an IP network need to satisfy quality constraints such as high availability and good tolerance to faults. The service availability constraint applies not only to the transfer layer (OSI network/transport layers), but also to the service layer.

Below in this document, the terms "quality of service" and "QoS" are used interchangeably to designate the same concept. Reference is also made to the following terms:

LS (location server): this is an entity of a telephone domain (ITAD) that manages the client locations and routes of a local ITAD. This equipment can interface with a neighboring LS in order to discover the locations of clients managed by other ITADs;

AS (autonomous system): this is a set of IP resources managed by a single administrative entity, also referred to as an IP connectivity provider. In the context of the border gateway protocol (BGP, RFC1771) for routing between domains, each AS is identified by a unique identifier. Such an AS is also referred to as an IP transfer domain.

BACKGROUND OF THE DISCLOSURE

1. Prior Art

In "conventional" telephony mode (using the public switched telephone network (PSTN)), telephony operators establish bilateral agreements to extend the global coverage of the telephone service. The level of coverage achieved depends essentially on the number of agreements made. In outline, it can be considered that two categories of telecommunications operator are in existence: local and/or national operators, and global operators. The major global operators make a large number of agreements and can thus reach most existing destinations. Local operators make only a small number of agreements, including only one or two with major operators. Thus, a incumbent national operator in a developing country will make agreements with other national operators and one or two agreements with global operators in order to deliver calls to the rest of the world.

At present, most operators are migrating their PSTN networks to solutions and infrastructures that are based on the IP network. To accompany the deployment of VoIP services, the Internet engineering task force (IETF) has undertaken a large amount of standardization work. Several protocols have been specified, amongst which mention can be made of session initiation protocol (SIP), session description protocol (SDP), real-time transfer protocol (RTP), real-time transfer control protocol (RTCP), multimedia gateway control protocol (MGCP), session announcement protocol (SAP), and telephony routing over IP (TRIP, RFC3219). These protocols satisfy different requirements and in particular they incorporate call signaling and control, the exchange and control of media streams, and the exchange of call routing information.

TRIP enables interconnected ITADs to exchange all of the destinations they can reach, thereby facilitating the selection of the gateways that are the most appropriate for delivering IP telephony traffic to the PSTN. The TRIP protocol is implemented by location servers (LS) that propagate TRIP routes containing attributes that serve to describe the routes in question. The use of this particular protocol is independent of the type of signaling protocol deployed for actually setting up calls. The TRIP protocol can be used together with SIP, H.323, or any other signaling protocol. Each LS maintains a local routing database known as the telephony routing information database (TRIB). This routing database is fed with advertisements received from neighboring LSes (from another telephony domain, for example). The operation of the TRIP protocol is similar to that of the BGP protocol. Advertisements between neighboring LSes are made in the form of route update messages, referred to simply as update messages. These messages are defined by the TRIP protocol and they are exchanged between LSes in order to inform a neighboring domain about routes that are available.

Activation of the TRIP protocol between various ITADs is described with reference to FIG. 1 (for reasons of simplicity, the term "domain" is also used to denote an ITAD), each ITAD being administered by a single telephony operator. Each of these operators has one or more LSes. Each LS maintains a routing database that it feeds with advertisements received from its neighbors (situated in other domains) and from LSes in its own domain. These advertisements are updated and forwarded to other neighbors when agreements permit this.

Thus, ITAD4 14, for example, updates the advertisements received from ITAD5 15 and forwards them to ITAD3 13. It should be observed that an ITAD is not necessarily deployed on a single IP transfer domain, also referred to an AS.

From the routing point of view, an LS handles three types of route:
- external routes, received from LSes situated in neighboring ITADs;
- internal routes, received from LSes situated in the same ITAD; and
- local routes, configured locally in each LS for injection into TRIP processes.

This operation is performed either by static configuration or by redistributing information coming from other routing protocols.

Thus, four types of TRIB are managed by an LS, as is shown in FIG. 2. These tables exist in a single LS, and the relationship between the tables are described with reference to FIG. 2.

"Adj-TRIBs-In" 22: stores routing information conveyed by update messages. This routing information, also referred to as "routes", constitutes the input to a route selection process 21 (decision process). A given LS maintains an adjacent TRIB-In table 22 for each neighboring LS in which it stores all of the route advertisements received from an adjacent LS;

"Ext-TRIB" 24: only one external TRIB table is maintained by an LS. This table contains the results of a route selection process applied to external routes 25 (Adj-TRIBs-IN) and local routes 26. Prior art techniques enable only one route to be selected per destination;

"Loc-TRIB" 20 ("local TRIB"): this table contains the local routes that result from applying routing policies that are local to each LS; and "Adj-TRIBs-Out" 23 (adjacent TRIBs out): these are the routes that the local LS will advertise to its peers.

In the transfer layer (the layer that actually transfers calls), it is possible to use the QoS-enhanced border gateway protocol (q-BGP) in order to be aware of the QoS treatment to which the voice streams will be subjected.

In the present state of the prior art, there does not exist any mechanism for managing the quality of service between telephony operators on IP.

2. Drawbacks of the Prior Art

One drawback of that prior art technique is the problem of QoS not being taken into consideration at service level in existing approaches. Available offers in terms of telephony rely on the transfer layer to perform the QoS treatment that is required by the digital streams (audio and/or video) that are to be transferred.

Unfortunately, means do not exist for (dynamically) correlating the two layers (service layer for ITAD via the TRIP protocol, for example, and transfer layer for ASes, via the BGP protocol, for example). A correlation can be put into place, but it requires a static route configuration. The TRIP protocol does not define an attribute that makes it easy to achieve correlation with the "q-BGP" protocol and the QoS information propagated thereby between different border routers.

Another drawback of that prior art technique is that LSes do not have dynamic and credible means for judging the QoS associated with a given route. As a result, LSes can select paths that offer calls that do not comply with the QoS expectations of end clients and that are not optimum.

SUMMARY

An aspect of the disclosure relates to a propagation method for propagating at least one route for at least one digital stream between a first location server suitable for managing locations of clients of a first IP telephony domain and a second location server suitable for managing locations of clients of a second IP telephony domain, said first location server belonging to a first autonomous system and said second location server belonging to a second autonomous system, said method comprising at step of sending digital stream routing update messages to said second location server.

According to an embodiment of the invention, the propagation method is characterized in that said update messages contain information for managing quality of service, in that, prior to being propagated towards said second server, and in that said information comprises at least one of the following:
- information about a quality of service component associated with at least one autonomous system, referred to as a system component; and
- information about a quality of service component associated with at least one IP telephony domain, referred to as a domain component.

Thus, an embodiment of the invention relies on a completely novel approach of propagating routes in IP telephony domains, thereby allowing said domains to receive information about quality of service while routing digital streams. This quality of service information is contained in the routing update messages that are exchanged between the location servers that form part of the IP telephony domains. There is therefore no need to modify existing hardware architectures in order to enable quality of service to be taken into account as an additional criterion for selecting inter-domain routes.

This information is split into two components. The quality of service information that is exchanged can thus take account of telephony domains and of autonomous systems taking charge of the actual transfer of IP packets, thereby ensuring consistency between the "service" layer of the telephony domain and the "transfer" layer as managed, for example, by the nodes making up the autonomous systems.

In another particular aspect of the invention, when said first IP telephony domain and said second IP telephony domain are identical, said updating does not modify the information for managing quality of service.

Thus, when transferring update messages between location servers, the location server that processes a message for propagation can update the quality of service information contained in that message. If the message is propagated to a location server situated in the same domain, then the quality of service information is not updated. When two location servers belong to the same domain, the quality of service delivered by a domain can be considered as being the same in each of the location servers in the domain.

According to a particular characteristic of an embodiment of the invention, when said first IP telephony domain and said second IP telephony domain are distinct and said autonomous system and said second autonomous system are identical, said updating takes account only of said at least one domain component.

When the autonomous systems passed through to connect together the different telephony domains to which two location servers belong are identical, then the quality of service offered at the transfer level does not vary. Thus, a route that passes through two different telephony domains but only one autonomous system will be subjected to the quality of service that is associated with the telephony domains, but the quality of service delivered during IP packet transfer will be that as delivered by the autonomous system. Updating therefore takes account only of the domain component since this is the only component that varies under such circumstances.

In a particular aspect of the invention, when said first IP telephony domain and said second IP telephony domain are distinct and when said first autonomous system and said second autonomous system are distinct, said updating takes account of said at least one domain component and of said at least one system component.

Thus, for a route passing through a plurality of telephony domains and a plurality of autonomous systems, both components of the information for managing quality of service are used for updating the quality of service associated with the route under consideration.

In a particular characteristic of an embodiment of the invention, said method includes a prior step of negotiating a quality of service management capacity, on the basis of at least one predetermined parameter between said first and second location servers so that said location servers exchange updating messages containing information about quality of service.

In order to make it possible to exchange quality of service information between location servers, thereby making said information available for the telephony domains, the location servers proceed, before exchanging any routes, with a negotiation about their respective capacities to take account of quality of service. This ensures that the location servers exchange quality of service information that they are both capable of taking into account.

According to an original characteristic of an embodiment of the invention, said method includes a step of selecting at least one route for propagating as a function of said information about managing quality of service.

Thus, a location server can select a route for propagating to another location server as a function of information about its capability for managing quality of service for a given destination. The location server thus selects routes that correspond to telephone service type quality expectations for transferring the digital streams.

According to a particular characteristic of an embodiment of the invention, at least one of said quality of service parameters is a mandatory quality of service parameter, and said selection step takes account of said at least one mandatory quality of service parameter.

Thus, when these parameters are mandatory, selecting the route to propagate will take account of the presence of and the values of these mandatory parameters.

According to a particular aspect of the invention, at least one quality of service parameter presents a hierarchical level, and said selection step takes account of said hierarchical level.

Together with their composite nature, these quality of service parameters also possess a hierarchical level. These levels are independent of the mandatory and/or optional character of the parameters. They enable parameters to be given priority when selecting the route to be propagated. Thus certain parameters can be taken into consideration before others when selecting the route that is to be installed in the local routing tables, and consequently the route that is to be propagated to the other peers.

An embodiment of the invention also provides a location server of a first IP telephony domain, which server is also suitable for propagating at least one route of at least one digital stream towards a second location server suitable for managing locations of clients of a second IP telephony domain, said first location server belonging to a first autonomous system and said second location server belonging to a second autonomous system, said first location server having means for sending digital stream routing update messages to said second location server;

the server being characterized in that said update messages contain information about managing quality of service;

in that, prior to being propagated towards said second server, said information about managing quality of service is updated by said first server; and in that, prior to being propagated towards said second server, said information for managing quality of service is updated by said first server; and In that said information comprises at least one of the following:
information about a quality of service component associated with at least one autonomous system, referred to as a system component; and
information about a quality of service component associated with at least one IP telephony domain, referred to as a domain component.

Thus, such a location server enables information to be conveyed about managing quality of service between IP telephony domains.

More generally, such a location server includes means for implementing the steps of the method of an embodiment of the invention for propagating at least one route.

In another embodiment, the invention also provides a computer program product that is downloadable from a communications network and/or stored on a computer readable medium and/or executable by a microprocessor.

According to the invention, in at least one embodiment, such a computer program product includes program code instructions for executing the method of propagating at least one route as described above.

BRIEF DESCRIPTION OF THE DRAWINGS

Other characteristics and advantages appear more clearly on reading the following description of a preferred embodiment given merely by way of non-limiting illustration, and with reference to the accompanying drawings, in which.

DETAILED DESCRIPTION OF ILLUSTRATIVE EMBODIMENTS

Figure 1:
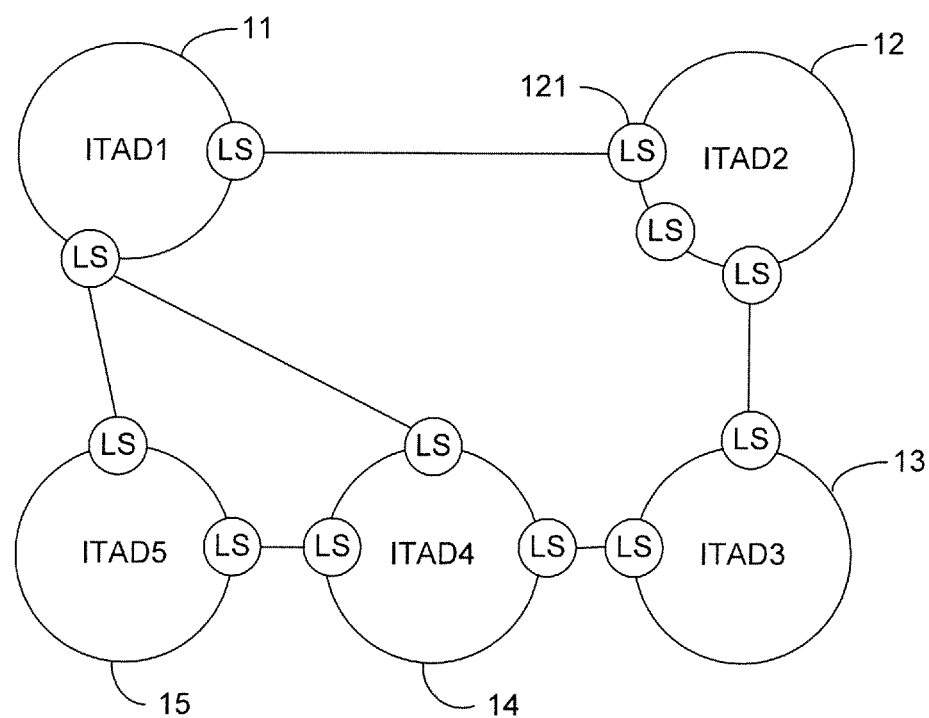
FIG. 1, described above, shows an example of architecture for telephony domains (ITADs)
Figure 2:
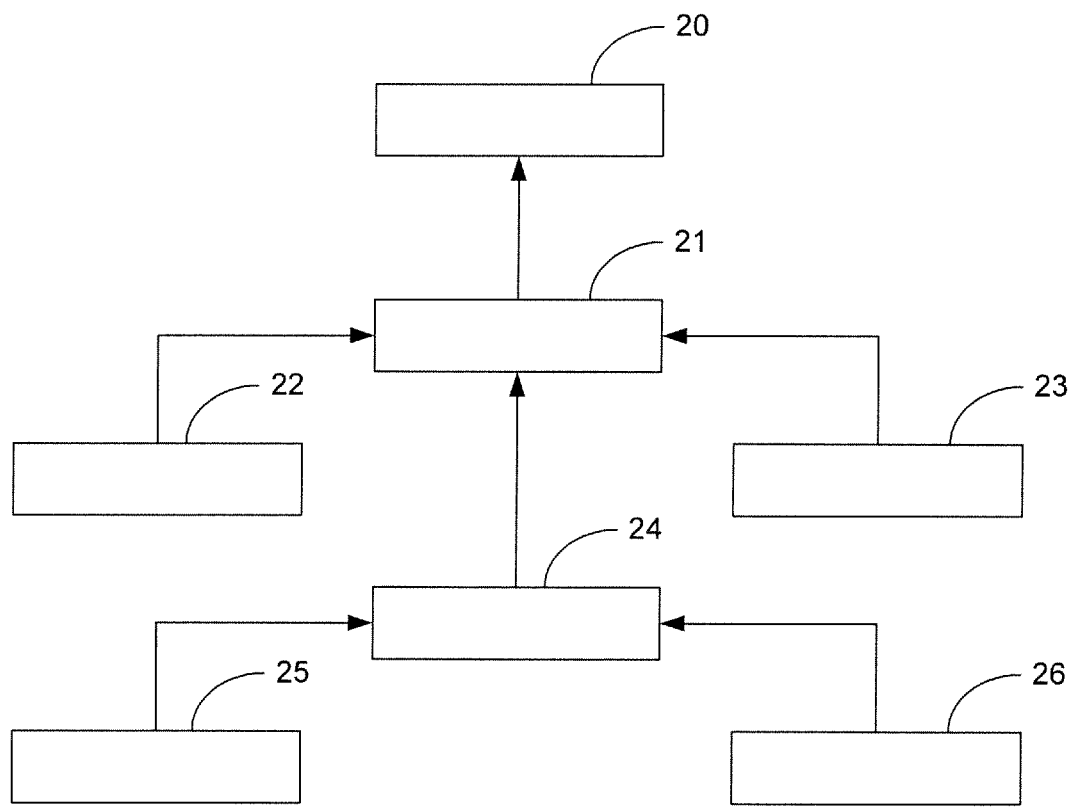
FIG. 2 shows a structure of the routing database (TRIB) used by the location servers (LSes) routing calls in the telephony domains (ITADs) shown in FIG. 1.

For greater clarity, there follows a description of an implementation of an embodiment of the invention using the TRIP protocol in the service layer. Nevertheless, it is clear that an embodiment of the invention is not limited to this particular protocol, and that it can also apply to any new protocol for exchanging routes between IP telephony domains.

1. General

An embodiment of the present invention incorporates two major aspects. Firstly, it presents a novel technique of making use of information in the service layer concerning the quality of service that applies at transfer level. It also introduces two novel and optimum methods of selecting routes for optimum quality of service.

In other words, it manages the quality of service of the telephony routing protocol, e.g. "TRIP", and it offers functions for selecting routes with service for given quality.

An embodiment of the invention thus proposes a technique of optimizing the quality of service between domains on the basis of QoS information exchanged between telephony domains. The term "QoS information" is used below to designate this information relating to the quality of service that applies to the data transfer layer.

By means of this information, the LSes can select the best path that offers the desired QoS in order to set up a given call.

In order to avoid TRIP sessions being closed because of attributes or messages being exchanged that do not comply with the TRIP RFC, the standard RFC3219 (described in the RFC3219 document by Rosenberg et al.: "Telephony routing over IP (TRIP)", January 2002) suggests proceeding during the opening of the TRIP session with an exchange about the capabilities of each LS, and then exchanging only those attributes that are supported by both of the peer LSes that are communicating with each other. Thus, each LS informs its neighbor about the options that it supports, and must under no circumstances send its neighbor any messages that cannot be properly interpreted thereby. If any such message is sent, the TRIP session will be closed.

In the context of an embodiment of this invention, a novel TRIP "capability" attribute is introduced that is called "QoS route capability", together with a new format for the "TRIP Route" attribute.

During opening of a TRIP session, the novel "QoS route capability" attribute serves to inform the various LSes about support for routes containing QoS information by the particular TRIP instance. Without this negotiation stage, the TRIP session would run the risk of being closed if a peer LS sends "TRIP Routes" that do not comply with the format defined by the RFC3219 standard. Once the stage of negotiating "capabilities" is successful, two peer LSes can exchange update messages containing modified "TRIP Route" attributes. Consequently, the TRIP protocol can support routes that include QoS information.

The modified "TRIP Route" attribute indicates the QoS values associated with the route in question. These values serve to inform the neighbor LS, and thus to propagate the quality of service associated with a given route. It should be observed that in TRIP terminology, a route designates a list of destination addresses (each address being defined by an address family indicator (AFI) and a prefix) in association with an application protocol such as SIP or H.323. Each route is associated with a set of attributes such as "NextHopServer", "AdvertisementPath", and "RoutedPath", and the meanings of these attributes are set out in detail in document RFC3219, respectively in its paragraphs 5.3, 5.4, and 5.5. These attributes are used for guiding the route selection that is to be installed in the TRIBs.

2. Description of the New QoS Attributes

In order to select an ITAD path that provides the best guarantees for QoS, the LSes need to have access to QoS information. Two modes can be envisaged: either the QoS information is exchanged in the TRIP, or the LS consults q-BGP routing tables. In this implementation, there is an exchange of QoS information associated with the TRIP protocol.

2.1 "QoS Route Capability"

Figure 3:
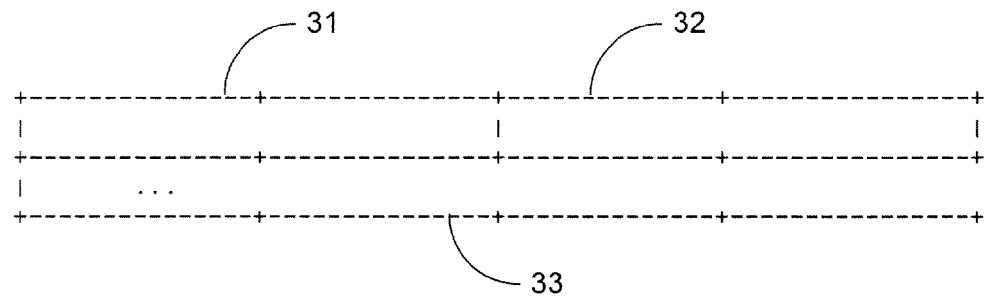
FIG. 3 shows a format of a "capability" attribute.

In accordance with the conventional TRIP procedure, the novel "capability" attribute of an embodiment of the invention, i.e. "QoS route capability" is exchanged when starting a TRIP session. In order to ensure that this complies with the TRIP protocol specification, and is thus accepted during the negotiation stage, it presents a format that is "conventional", as shown in FIG. 3. It can be seen that this attribute is optional and that it is not necessarily supported by all TRIP implementations.

It contains three fields 31, 32, and 33:
- a "capability code", first field 31 having a length of two octets contains a code identifying the "capability";
- a "capability length", second field 32 also having a length of two octets contains the length of the "capability"; and
- finally a "capability value" third field 33 of variable size contains the value of the "capability".

In order to avoid errors during exchanges of update messages containing modified "TRIP Route" attributes, so as to avoid TRIP sessions closing, and in order to inform the peers of a given LS about the support for routes with QoS information, a new "capability" is introduced referred to as "QoS route capability" and its "capability code" is equal to 4.

Figure 4:
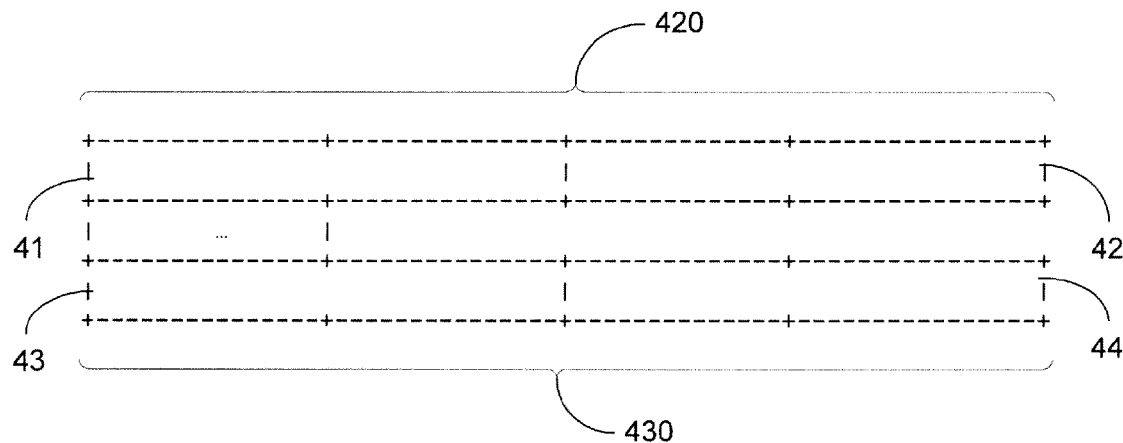
FIG. 4 shows the format of the "capability value" field of the new "QoS route capability" attribute that is specific to an embodiment of the invention.

The format of the "capability value" field 33 of the "capability information" attribute specific to "QoS route capability" is shown in FIG. 4.

It contains a series of "address family" fields 41, 43 and of "application protocol" fields 42, 44, each of these two fields presenting a size of two octets. An LS peer may inform its neighbors about the types of address it supports and that will be used when putting data into the "TRIP Route" fields. One or more ("address family", "application protocol") pairs can be provided. With reference to FIG. 4, a first pair 420 is constituted by fields 41 and 42 and a second pair 430 is constituted by fields 43 and 44, for example.

The meanings of the "address family" and "application protocol" fields 41, 42, 43, and 44 are the same as those described in Section 5.1.1 of RFC3219, and reproduced herein as an annex, said annex forming an integral portion of the present description.

2.2 The Modified "TRIP Route" Attribute

Figure 5:
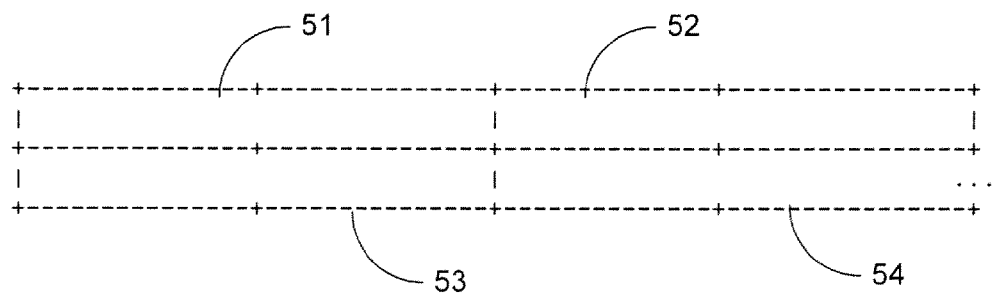
FIG. 5 shows the conventional format for the "TRIP Route" attribute.

The present specification (RFC3219) of the TRIP protocol does not enable QoS information to be advertised. The format of the "TRIP Route" attribute defined by RFC3219 is shown in FIG. 5.

It contains four fields 51, 52, 53, and 54, corresponding respectively to "address family", "application protocol", "length", and finally "address". The first three fields 51, 52, and 53 present a size of two octets, whereas the last field 54 is of variable size.

Figure 6:
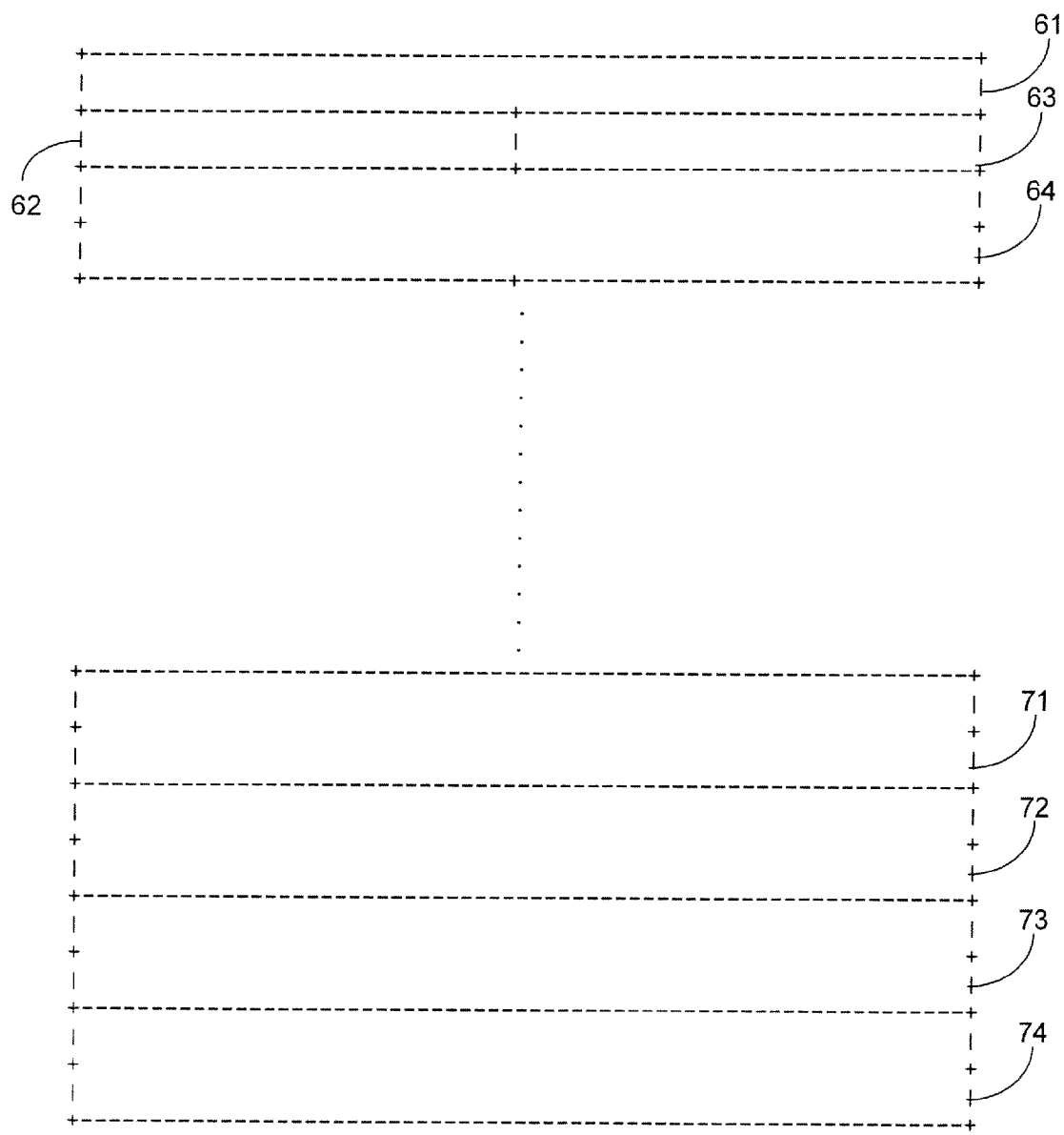
FIG. 6 shows the format of the "TRIP Route" attribute modified according to an embodiment of the invention.

In an embodiment of the invention, in order to enable TRIP Routes to be advertised that include QoS information, the "TRIP Route" attribute is modified as shown in FIG. 6.

It contains a plurality of fields, numbered 61 to 74, having the following names and sizes:
- a "QoS information length" field 61 with a length of one octet;
- a "QoS information code" field 62 with a length of four bits (half an octet);
- a "QoS information subcode" field 63 with a length of four bits;
- a "QoS information value" field 64 with a length of two octets;
- fields 62, 63, and 64 that are repeated as a function of the number of quality of service parameters supported by the route;
- an "address family" field 71 with a length of two octets;
- an "application protocol" field 72 with a length of two octets;
- a "length" field 73 with a length of two octets; and
- an "address" field 74 of variable length.

The "address family", "application protocol", "length", and "address" fields are defined in Section 5.1.1.1 of the RFC3219 standard, and are annexed to the present description.

The new fields of an embodiment of the invention have the following meanings:
- the "QoS information length" field gives the number of QoS information codes (i.e. the number of QoS parameters) sent by an LS in an update message to its neighboring LSes (peers);
- the "QoS information code" indicates the type of QoS information provided in the "QoS information value" field. This field may take the following values:
  - (0) "reserved"
  - (1) "packet rate"
  - (2) "one-way delay metric"
  - (3) "inter-packet delay variation"
- the "QoS information subcode" field gives the subtype of the QoS information provided in the "QoS information value" field. This field can take the following values:
  - (0) "none"
  - (1) "reserved rate"
  - (2) "available rate"
  - (3) "loss rate"
  - (4) "minimum one-way delay"
  - (5) "maximum one-way delay"
  - (6) "average one-way delay"
- the "QoS information value" field gives the value of the QoS information. The unit of this field depends on the type of QoS information code.

2.3 Procedure

It is recalled that the standard version of the TRIP protocol provides for routing information to be exchanged between two neighboring LSes via the update message. The update message contains a certain number of attributes. One of these attributes known as "TRIP Route" contains routes for reaching given destinations.

In an embodiment of the invention, an LS advertises routes including QoS information to its neighboring/peer LSes by sending an update message containing modified "TRIP Route" attributes, as described in the above section. Each "TRIP Route" is associated with specific route attributes such as the ITAD path (the two attributes giving this type of information are "AdvertisementPath" and "RoutedPath") the next hop (given by the "NextHopServer" attribute), and also the path of the ASes that actually transfer data in the transfer layer. This AS path is given by a new attribute called "AS_PATH", with the identification thereof being given in detail in the next section.

When an LS receives TRIP routes in an update message from a neighboring LS, it is in a position to modify the QoS information contained in the modified "TRIP Route" attribute, depending on the type of LS from which it has received the route in question:
- when a given LS receives the route from another peer LS situated in its own ITAD, this LS does not modify the "TRIP Route" attribute;
- when an LS receives the route from a peer LS situated in some other, neighboring ITAD, then this LS can update the "TRIP Route" attribute as follows:
  - if the neighboring ITAD uses the same IP connectivity service supplier for delivering voice traffic (this information is contained in the AS_PATH attribute defined in the following section), then this LS updates the information contained in the modified "TRIP Route" attribute by taking account only of the service portion and not of the QoS information relating to the transport portion. This updating is described below;
  - if the neighboring ITAD does not use the same IP connectivity service supplier for delivering voice traffic, then this LS updates the information contained in the modified "TRIP Route" attribute while taking account of the QoS information relating to the service and transport layers.

When an LS originates the advertisement, it places in the QoS information in the modified "TRIP Route" attribute the QoS characteristics including both the service layer and the transfer layer.

The QoS information relating to the transfer layer can be determined using two approaches. In a first implementation, it is possible to take account only of local information provided by the IP network service provider to the telephony operator. In a second approach, it is possible to rely on QoS information conveyed by a protocol of the transport layer (also known as the IP layer), such as q-BGP [QBGP].

This information coming from the IP layer, e.g. via the q-BGP protocol, may be static or dynamic:

Static: this QoS information is said to be static because it has values that do not vary over time. The value of this type information is provided statically within a system. This information is provided by the IP telephony operator in the form of a service contract containing QoS clauses (i.e. a service level agreement (SLA)).

Said component of the system is statically associated with said at least one autonomous system in compliance with at least one predetermined level of service agreements.

Under such circumstances, a service level agreement is associated with each autonomous system. The quality of service of the autonomous system is thus considered as being constant/static. The service level agreement is negotiated statically between the autonomous systems making up the network and is given to the IP telephony domain.

Dynamic: the values of this information vary over time. The IP telephony operator can then have access to dynamic values with the help of an interface made available thereto by the IP connectivity supplier (i.e. managing the AS in which the telephony domain elements are deployed), which supplier has implemented appropriate mechanisms such as measuring and monitoring tools for determining the IP performance of its own AS.

The component of the system is dynamically associated with said at least one autonomous system by means of an IP connectivity interface that associates said first location server and said first autonomous system.

Under such circumstances, the system component is dynamic and therefore varies over time. It is therefore accessible to the telephony domain by means of an interface enabling a location server of the telephony domain to know at a given instant the level of the quality of service provided by the autonomous system on which it is based, by means of a plurality of quality service parameters.

The quality of service information that is manipulated by location servers (in particular when updating QoS information contained in received or sent route advertisement messages) contains two components:

the service portion: this component gives information only about the QoS parameters relating to the telephony domain platform. For example: the mean delay required for processing calls in telephony servers is 5 milliseconds (ms), and the mandated maximum delay for processing calls in telephony servers is 10 ms;

the transport portion: this component relates to the values of QoS parameters supplied by the IP connectivity supplier (described above and being dynamic or static). For example, the mean delay required for passing through the AS is 50 ms, and the mandated maximum delay for passing through the AS is 100 ms.

Thus, for the telephony service, the value of a QoS parameter is equal to the sum of the service component plus the transfer component. In the above example, the mean delay required for processing calls is (5 ms+50 ms=55 ms), and the mandated maximum delay for processing calls is (10 ms+100 ms=110 ms).

According to an embodiment of the invention, the operation of modifying QoS information contained in TRIP messages consists in concatenating the values of the QoS parameters local to the domain receiving the TRIP advertisement with those already contained in the route advertisement (i.e. those contained in the update message). The method of concatenation depends on the kind of QoS parameters in question. By way of example, mention can be made of QoS parameters that are additives, and of QoS parameters that are multiplicative.

For additive QoS parameters, the result of the concatenation operation is the sum of the local value for the parameter in question plus the value already contained in the route advertisement message received from a neighboring LS.

To illustrate this circumstance, mean delay is used as an example. It is assumed that two domains ITAD1 and ITAD2 exchange TRIP routing information that includes QoS information. Assuming that the value of the mean delay for passing through ITAD1 is 15 ms, if ITAD2 advertises data destinations to ITAD1 with a mean delay value that is equal to 55 ms, then ITAD1 can in turn advertise those destinations to other neighbors by setting the mean delay parameter to 15 ms+55 ms=70 ms.

For multiplicative QoS parameters, the result of the concatenation operation is to multiply the local value of the parameter in question with the value already contained in the route advertisement message received from a neighbor. To illustrate this circumstance, a multiplicative parameter QS1 is taken as an example. It is assumed that two domains ITAD1 and ITAD2 exchange TRIP routing information including QoS. It is assumed that the value of QS1 for passing through ITAD1 is VAL1, so if ITAD2 advertises data destinations to ITAD1 that have a value for QS1 that is equal to VAL2, then ITAD1 can in turn advertise those destinations to other neighbors by setting the mean delay parameter to a value (VAL1*VAL2).

There follows another example of updating QoS information in a location server LS of an embodiment of the invention. It is assumed that a local LS receives, from a neighboring LS, a route containing the following QoS information:

mean delay=200 ms;

maximum delay=300 ms.

1. If the local LS is in the same ITAD as the neighboring LS that advertised the routes, the QoS information is not modified;

2. If the LS is in an ITAD different from that of the neighboring LS:
  a) If both ITADs use the same AS, then only the service component of the QoS information is taken into account for updating the QoS information. Thus:
    i) the updated mean delay=200 ms+5 ms=205 ms;
    ii) the updated maximum delay=300 ms+10 ms=310 ms;
  b) If both ITADs use different ASes, then both the service and the transfer components of the QoS information are taken into account for updating the QoS information. Thus:
    i) the updated mean delay=200 ms+5 ms+50 ms=255 ms;
    ii) the updated maximum delay=300 ms+10 ms+100 ms=410 ms.

3. Method of Identifying the ASes Taken by a Given Route

In order to enable quality of service parameters to be transferred and in order to enable routes to be selected on the basis of quality of service, a new attribute is introduced containing information about the IP connectivity service suppliers used for conveying voice traffic. More clearly, the service layer is allowed to identify the ASes, or IP connectivity operators that are used for the voice traffic. An LS then has simple and effective means for optimizing an end-to-path for a given destination. The same information also enables anomalies to be detected, such as IP spirals, for example, since the service layer knows which ASes the data passes through.

3.1 Format

Conventionally, it is recalled that the TRIP protocol is implemented by location servers (LSes) that propagate TRIP Routes containing attributes enabling the routes in question to be particularized.

More precisely, the standard version of the TRIP protocol (set out in detail in document RFC3219 by Rosenberg et al.: "Telephony routing over IP (TRIP)", January 2002) makes provision for routing information to be exchanged between two neighboring LSes via the update message, which comprises a certain number of attributes.

In order to know the list of IP connectivity service providers used for conveying the voice traffic of an ITAD, a new attribute is introduced called AS_PATH. This attribute comprises the following attributes:

conditional mandatory: true

TRIP type code: to be defined by IANA
conditional mandatory: this attribute indicates whether the attribute in question must be or need not be filled in a TRIP message
TRIP type code: a unique identifier for the TRIP message in question.

The purpose of this attribute is to create and store a list of the ASes passed through in order to reach a given destination. It is then propagated from one IP domain to a neighboring IP domain.

The AS_PATH attribute is made up of a sequence of "AS path" segments, or fields. Each "AS path" segment is made up of a triplet <path segment type, path segment length, path segment value>, defined as follows:

Each "path segment type" has a length of one octet and can take the following values:

| Value | Type of segment |
|---|---|
| 1 | AS_SET: a non-ordered series of ASes passed through in order to reach a given destination contained in a TRIP update message |
| 2 | AS_SEQUENCE: an ordered series of ASes passed through in order to reach a given destination contained in a TRIP update message. |

Each "path segment length" has a length of one octet and contains the number of ASes contained in the "path segment value".

The "path segment value" field contains one or more AS numbers, each encoded as a field having a length of two octets.

This new attribute thus gives the succession of ASes that are passed through in order to reach a given destination.

3.2 General Procedure for Route Selection

It is recalled that each operator has one or more LSes. Each LS maintains a routing table that it feeds with advertisements received from neighboring LSes and from LSes in its own domain. These advertisements are updated and redistributed to other neighbors if interconnection agreements make that possible.

Thus, when an LS propagates a TRIP Route that it has discovered in an update message from another neighboring LS, provision is made for it to modify the new AS_PATH attribute of the route depending on the type of LS to which the route is to be repropagated, with modification being done as follows.

When a given LS advertises the route to another TRIP (peer LS) situated in its own ITAD, the LS does not modify the AS_PATH attribute associated with the route.

If the LS to which the route is advertised (peer LS), is not situated in the same ITAD, two circumstances arise for updating the AS_PATH attribute:
  if the first segment of AS_PATH is of the AS_SEQUENCE type, the local system adds the number of its IP connectivity service supplier as the last element in the sequence;
  if the first segment of AS_PATH is of the AS_SET type, then the local system adds a new segment of AS_SE-QUENCE type to the beginning of the AS_PATH; this new segment contains the number of the domain of its IP connectivity service supplier.

If the LS originates the advertisement, then it includes the number of its own IP connectivity service supplier in the AS_PATH attribute in all of the update messages that are to be sent to its TRIP peers situated in the neighboring ITADs.

Furthermore, the LS includes an empty AS_PATH in all of the update messages for sending to its TRIP peers situated in its own ITAD.

4. Process of Selecting Routes with Quality of Service

In order to improve the end-to-end quality of service experienced by telephone services, the inventors have found that it is desirable for the process of selecting an inter-ITAD TRIP route to take account of quality of service information in order to guide the selection of the route for storing in the TRIP routing databases. Consequently, the route selection process as described in the RFC3219 standard is no longer appropriate since it does not take these quality of service criteria into account.

There follows a description of new two methods of selecting routes based on quality of service information exchanged between neighboring ITADs, using the above-described procedure, and relying in particular on the modified "TRIP Route" attribute.

It is assumed that an IP telephony operator gives priorities to each QoS parameter advertised in TRIP messages. For example, an operator can give highest priority to the parameter "minimum one-way delay", and low priority to the parameter "loss rate", and so on. The values given to priorities can also be determined by a standardization organization such as the Internet Engineering Task Force (IETF) or the International Telecommunication Union (ITU).

The algorithms described below are based on this principle of allocating priorities for the QoS parameters conveyed in TRIP messages, in particular in the "TRIP Route" attribute as modified in accordance with the procedure described in paragraph 5.2 of the present description.

4.1 Algorithm 1

Figure 7:
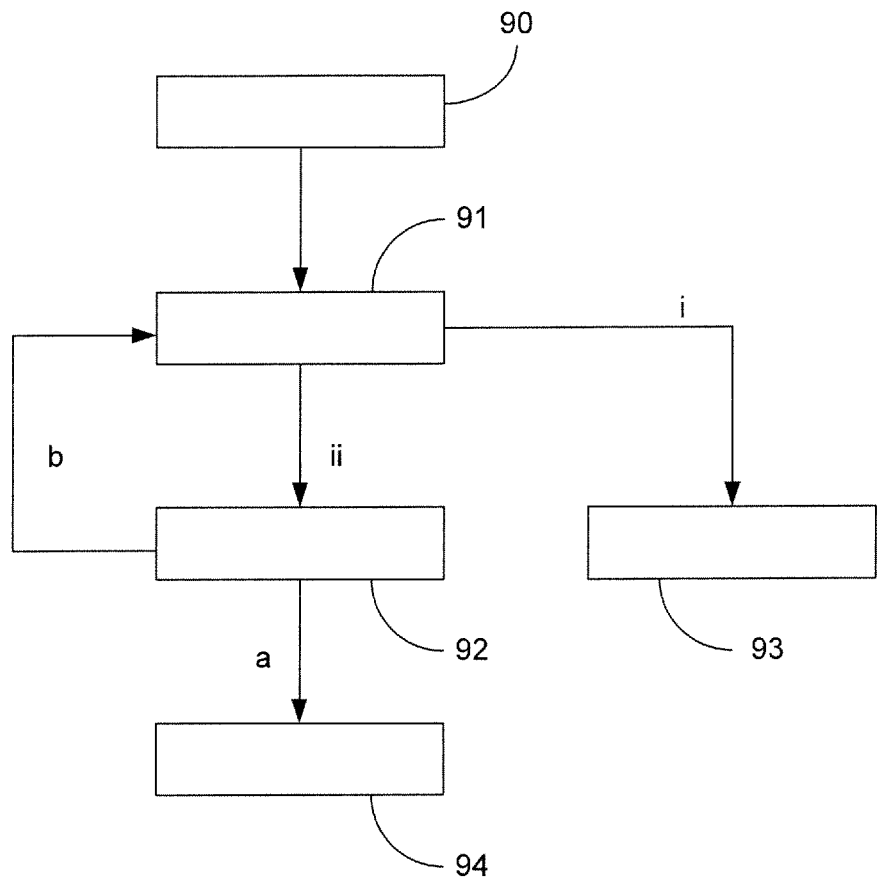
FIG. 7 is a flow chart showing a route selection algorithm in a first implementation.

The algorithm shown in FIG. 7 for selecting TRIP Routes takes account of the QoS information exchanged by TRIP and installs this information in the local TRIB.

It begins with a first step 90 of identifying routes serving a given single destination.

Then, in a step 91, the quality of service performance characteristic that has the highest priority is examined. In this step 91, routes that optimize this quality of service performance characteristic are identified.

Two situations are then taken into account. If only one route is returned (i), then the algorithm performs a step 93 of storing this route in the local TRIB. If more than one route is returned (ii), then a step 92 serves to "exclude" the quality of service performance characteristic that is used in step 91 from the list of quality of service performance characteristics.

a) If following the "exclusion" step 92, there is no remaining quality of service performance characteristic, then the conventional TRIP Route selection method is performed, in a step 94, assuming that more than one route was identified in step 90; and b) otherwise the algorithm reiterates step 91.

4.2 Algorithm 2

Nevertheless, in another implementation of the invention, it is possible to introduce a hierarchical level for controlling the QoS information exchanged by TRIP between two neighbors.

The above algorithm can then be modified. The additional hierarchical level introduced may then correspond to defining two types of QoS parameter:
  "mandatory" corresponding to all of the QoS parameters that must be supplied by a neighboring LS in its update messages. If a TRIP advertisement does not contain a QoS parameter of this type, then the advertisement is deleted;

"optional" is a category in which optional QoS information is grouped together that need not necessarily be given by a neighboring LS in its update messages. If a TRIP advertisement does not contain a QoS parameter of this type, then the advertisement is not deleted.

The purpose of this level of control is to ensure consistency concerning the QoS information exchanged between the IP telephony operators, i.e. between ITADs. Nevertheless, the mandatory or optional character of these parameters can perfectly well be introduced without any parameter hierarchy.

Figure 8:
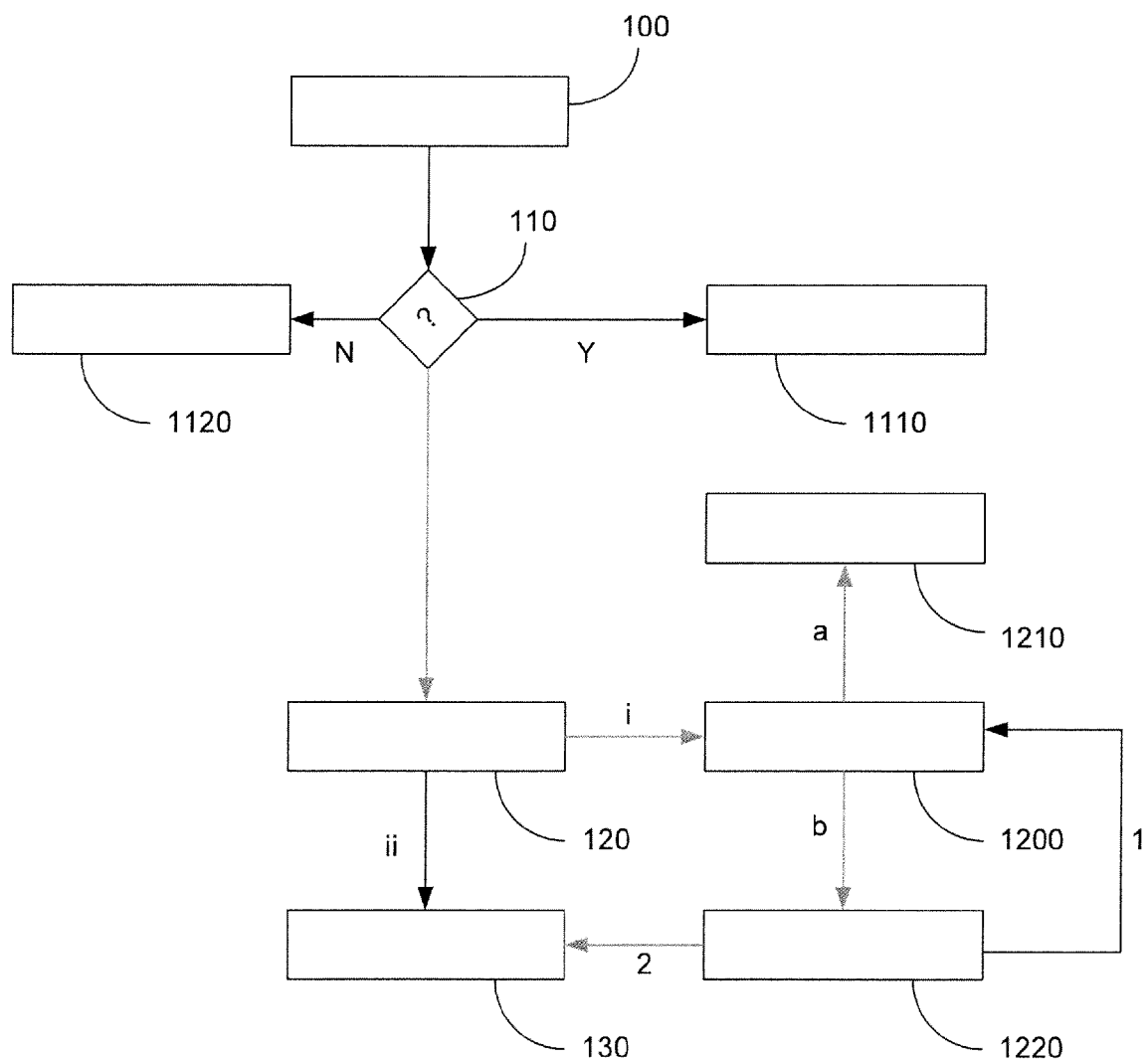
FIG. 8 is a flow chart showing an algorithm making a route selection according to a second implementation.

With reference to FIG. 8, an embodiment of the invention proposes a novel algorithm that takes account of hierarchical level when selecting a route that is optimum in terms of end-to-end quality of service.

The method has a first step 100 of identifying routes that serve the same given destination.

If the number of remaining routes is not zero, there follows a step 110 of verifying, for each route, whether the "mandatory" quality of service performance characteristics are present or given values.

If so, the route being verified is added to the list of routes remaining in a step 1110. Otherwise, this route is set aside (step 1120).

The remaining routes are then examined in a step 120.

If the number of remaining routes is not zero, a step 1200 examines the quality of service performance characteristic that has the highest priority and returns the route that optimized this quality of service performance characteristic:

a) if only one route is returned, a step 1210 stores this route in the local TRIB;

b) if more than one route is returned, a step 1220 excludes the quality of service performance characteristic that was used in step 1200 from the list of quality of service performance characteristics.

At the end of this step 1220, if no quality of service performance characteristic remains, then the conventional TRIP Route selection method is implemented (step 130), providing more than one route was returned in step 100.

Otherwise, if a quality of service performance characteristic remains, then step 1200 is reiterated.

Following step 120, if the number of remaining routes is zero, then the algorithm executes the conventional TRIP Route selection method at step 130, providing more than one route was returned during step 100.

In conclusion, these two methods are advantageous for an IP telephony operator seeking to deploy a QoS information exchange mechanism with neighboring operators. These algorithms are invoked in order to select the TRIP Routes for installing in the local routing tables. By means of this, telephony operators are in a position to select optimum routes having the best quality of service. In a particular implementation, these algorithms can be used to implement optimization of call costs.

5. Annex
RFC3219

| Code | Address Family |
|---|---|
| 1 | "Decimal Routing Number" |
| 2 | "PentaDecimal Routing Numbers" |
| 3 | "E.164 Numbers" |

| Code | Protocol |
|---|---|
| 1 | SIP |
| 2 | H.323-H.225.0-S.931 |
| 3 | H.323-H.225.0-RAS |
| 4 | H.323-H.225.0-Annex-G |

Length:
Corresponds to the length of the "address" field in octets
Address:
Corresponds to an address (prefix) of the type of family given by the "address family" field. The length in octets of the address is variable and is determined by the field length of the route.

Although the present disclosure has been described with reference to one or more examples, workers skilled in the art will recognize that changes may be made in form and detail without departing from the scope of the disclosure and/or the appended claims.

The invention claimed is:

1. A method comprising:
propagating at least one route for at least one digital stream between a first location server suitable for managing locations of clients of a first IP telephony domain and a second location server suitable for managing locations of clients of a second IP telephony domain, which is distinct from said first IP telephony domain, wherein the first and second location servers reside on a telephony domain service layer, said first location server belonging to a first autonomous system and said second location server belonging to a second autonomous system, which is distinct from said first autonomous system, wherein the first and second autonomous systems reside on an IP transport layer, which is distinct from the telephony domain service layer, said propagating comprising:
a step of sending digital stream routing update messages on said telephony domain service layer, from said first location server to said second location server, wherein said update messages contain information for managing quality of service, which comprises the following:
information about a quality of service component associated with at least one autonomous system on the IP transport layer, referred to as a system component; and
information about a quality of service component associated with at least one IP telephony domain on the telephony domain service layer, referred to as a telephony domain component; and
prior to being propagated towards said second location server, said first location server updates the information for managing quality of service to include further information about:
quality of service relating to the first IP telephony domain on the telephony domain service layer; and
quality of service relating to the first autonomous system on the IP transport layer.

2. The method of propagating according to claim 1, wherein the method includes a prior step of negotiating a quality of service management capacity based on at least one predetermined parameter, between said first and second location servers, so that said location servers exchange updating messages containing information about quality of service.

3. The method of propagating according to claim 2, wherein the method includes a step of selecting at least one route for propagating as a function of said information about managing quality of service.

4. The method of propagating according to claim 3, wherein at least one of said predetermined parameters is a mandatory quality of service parameter; and
said selection step takes account of said at least one mandatory quality of service parameter.

5. The method of propagating according to claim 4, wherein said at least one predetermined parameter presents a hierarchical level; and
said selection step takes account of said hierarchical level.

6. The method of claim 1, wherein the information about a quality of service component associated with at least one autonomous system on the IP transport layer comprises static information that does not change over time.

7. The method of claim 1, wherein the information about a quality of service component associated with at least one autonomous system on the IP transport layer comprises dynamic information that changes over time.

8. The method of claim 1, wherein the quality of service relating to the first IP telephony domain on the telephony domain service layer comprises a delay required for processing calls by the first location server.

9. The method of claim 1, wherein the quality of service relating to the first autonomous system on the IP transport layer comprises a delay for data passing through the first autonomous system.

10. The method of claim 1, wherein the first location server updates the information for managing quality of service by concatenating a value of the quality of service relating to the first IP telephony domain on the telephony domain service layer, which is local to the first location server, to values of the information about the quality of service on the telephony domain service layer already associated with the at least one route.

11. The method of claim 1, wherein the first location server updates the information for managing quality of service by concatenating values of both the quality of service relating to the first IP telephony domain on the telephony domain service layer and the quality of service relating to the first autonomous system on the IP transport layer, to values of the information for managing quality of service already associated with the at least one route.

12. A first location server comprising:
a processor configured to manage locations of clients of a first IP telephony domain and to propagate at least one route of at least one digital stream towards a second location server suitable for managing locations of clients of a second IP telephony domain, which is distinct from said first IP telephony domain, wherein the first and second location servers reside on a telephony domain service layer, said first location server belonging to a first autonomous system and said second location server belonging to a second autonomous system, which is distinct from said first autonomous system, wherein the first and second autonomous systems reside on an IP transport layer, which is distinct from the telephony domain service layer, wherein the processor is configured to perform the following steps when propagating the at least one route:
sending digital stream routing update messages on said telephony domain service layer, from said first location server to said second location server, wherein said update messages contain information about managing quality of service, which comprises the following:
information about a quality of service component associated with at least one autonomous system on the IP transport layer, referred to as a system component; and
information about a quality of service component associated with at least one IP telephony domain on the telephony domain service layer, referred to as a telephony domain component; and
prior to being propagated towards said second location server, updating the information for managing quality of service to include further information about:
quality of service relating to the first IP telephony domain on the telephony domain service layer; and
quality of service relating to the first autonomous system on the IP transport layer.

13. A computer program product stored on a non-transitory computer readable medium and comprising program code instructions for executing a method when executed by a processor, wherein the method comprises:
propagating at least one route for at least one digital stream between a first location server suitable for managing locations of clients of a first IP telephony domain and a second location server suitable for managing locations of clients of a second IP telephony domain, which is distinct from said first IP telephony domain, wherein the first and second location servers reside on a telephony domain service layer, wherein said first location server belongs to a first autonomous system and said second location server belongs to a second autonomous system, which is distinct from said first autonomous system, wherein the first and second autonomous systems reside on an IP transport layer, which is distinct from the telephony domain service layer, and wherein said propagating comprises:
a step of sending digital stream routing update messages on said telephony domain service layer, from said first location server to said second location server, wherein said update messages contain information for managing quality of service, which comprises the following:
information about a quality of service component associated with at least one autonomous system on the IP transport layer, referred to as a system component; and
information about a quality of service component associated with at least one IP telephony domain on the telephony domain service layer, referred to as a telephony domain component; and
prior to being propagated towards said second location server, said first location server updates the information for managing quality of service to include further information about:
quality of service relating to the first IP telephony domain on the telephony domain service layer; and
quality of service relating to the first autonomous system on the IP transport layer.

* * * * *